United States Patent [19]

Shiomi et al.

[11] Patent Number: 4,566,837
[45] Date of Patent: Jan. 28, 1986

[54] AUTOMATIC WORK EXCHANGING APPARATUS

[75] Inventors: Tadataka Shiomi; Kouichi Nabika, both of Gifu; Takashi Kawagoe, Shiga, all of Japan

[73] Assignee: Murata Kikai Kabushiki Kaisha, Japan

[21] Appl. No.: 660,542

[22] Filed: Oct. 12, 1984

Related U.S. Application Data

[63] Continuation of Ser. No. 380,764, May 21, 1982, abandoned.

[30] Foreign Application Priority Data

May 24, 1981 [JP] Japan .................................. 56-79006

[51] Int. Cl.$^4$ ............................................. B25Q 7/02
[52] U.S. Cl. ..................................... 414/222; 104/48; 104/162; 187/8.59; 198/465.1; 269/14; 414/415; 414/523; 414/528

[58] Field of Search ............... 414/523, 495, 401, 353, 414/351, 347, 222, 584, 528; 198/339, 472, 458, 614; 269/13, 14, 58, 61, 71; 187/8.59, 95; 180/168; 104/162, 48

[56] References Cited

U.S. PATENT DOCUMENTS 3,998,344  12/1976  Pellen ............................. 414/523 X
4,373,840  2/1983   Miller, Jr. ....................... 414/751 X Primary Examiner—Robert J. Spar
Assistant Examiner—Donald W. Underwood
Attorney, Agent, or Firm—Spensley Horn Jubas & Lubitz

[57] ABSTRACT

An automatic work exchanging apparatus for transferring works between a transport truck running in front of plural machine tools and the plural machine tools. The automatic work exchanging apparatus is made to run along the row of the machine tools, and a working face of the apparatus is made vertically movable so that the working face is adjustable according to the height of the table of each machine tool.

1 Claim, 5 Drawing Figures

AUTOMATIC WORK EXCHANGING APPARATUS

This application is a continuation of application Ser. No. 380,764, filed May 21, 1982 now abandoned.

BACKGROUND OF THE INVENTION

The present invention relates to an automatic work exchanging apparatus for use in an automatic work transporting system in a machine factory.

Automation and labor saving in machine tooling has recently shown considerable progress by the use of numerically-controlled machine tools and robots. Also, substantially workerless operation is already achieved in an independent machining center represented by the machining center having a pallet conveyor.

However, the material handling in a machining factory, i.e. the transportation of works from the warehouses, supply thereof to machine tools and transportation of articles after machining, are generally conducted by the workers, with danger involved in the handling of heavy articles and also with humane limitation in the work efficiency. Usually works of various shapes are handled in such factory, and the transportation and precise positioning of such works on the table of machine tool are quite cumbersome and have to depend on the experience of workers. Although there exists a requirement for an automated material handling system for automatically transporting and positioning such various works and conveying the works after machining, such a system has to be able to supply the works of varied shapes to machine tools with an extremely high accuracy. For examples, a transfer and lift mechanism have been proposed by U.S. Pat. No. 3,655,090.

The present invention relates to an automatic work exchanging apparatus meeting such requirement. Since the work exchanging time is generally far shorter than the machining time, an automatic exchanging apparatus, if provided for each machine tool, will not only result in substantial idle time for such apparatus but also in an inordinate expense, as a large number of expensive exchanging apparatus will be required.

SUMMARY OF THE INVENTION

An object of the present invention is to provide an economical and efficient automatic work exchanging apparatus capable of meeting the exchange requirements of a plurality of machie tools.

Another object of the present invention is to provide an automatic work exchanging apparatus for transferring works between a transport truck and a plurality of machine tools.

An automatic work exchanging apparatus of the present invention comprises a truck laterally displaceable in front of the machine tool along rails, a platform vertically movable along supports positioned at four corners and at the center of the sides of the truck, and a pallet displacing device positioned on the platform.

The automatic work exchanging apparatus of the present invention, being provided with self-displacing function and vertically displacing function, is capable of coping with plural machine tools with different heights of table, thereby enabling reduction of the number of expensive automatic work exchanging apparatus and the waiting time thereof, thus achieving significant efficiency and economy.

DETAILED DESCRIPTION OF THE INVENTION

Figure 1:
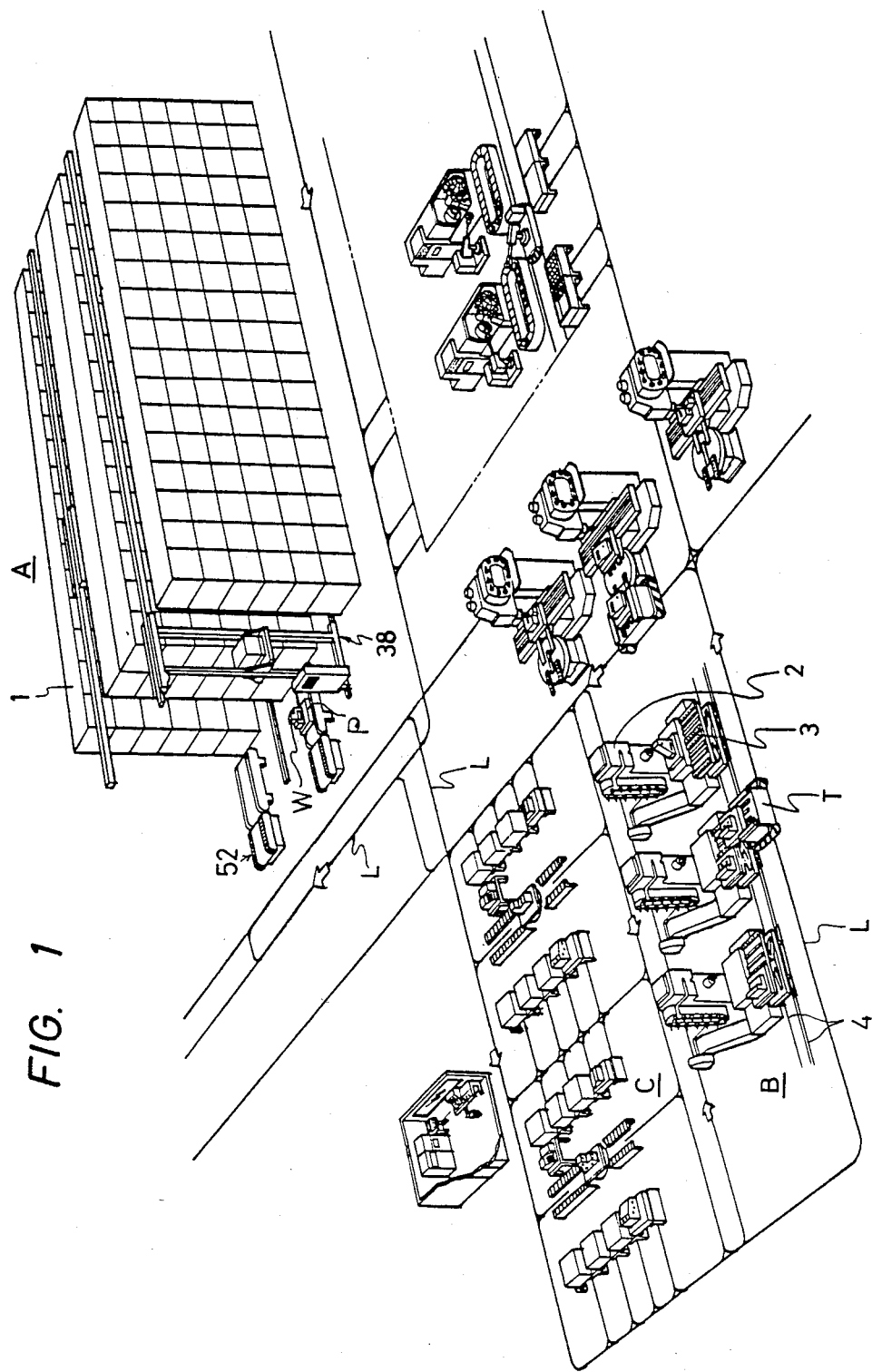
FIG. 1 is a perspective view showing an entire working process provided with a plurality of automatic work exchanging apparatus embodying the present invention.
Figure 2:
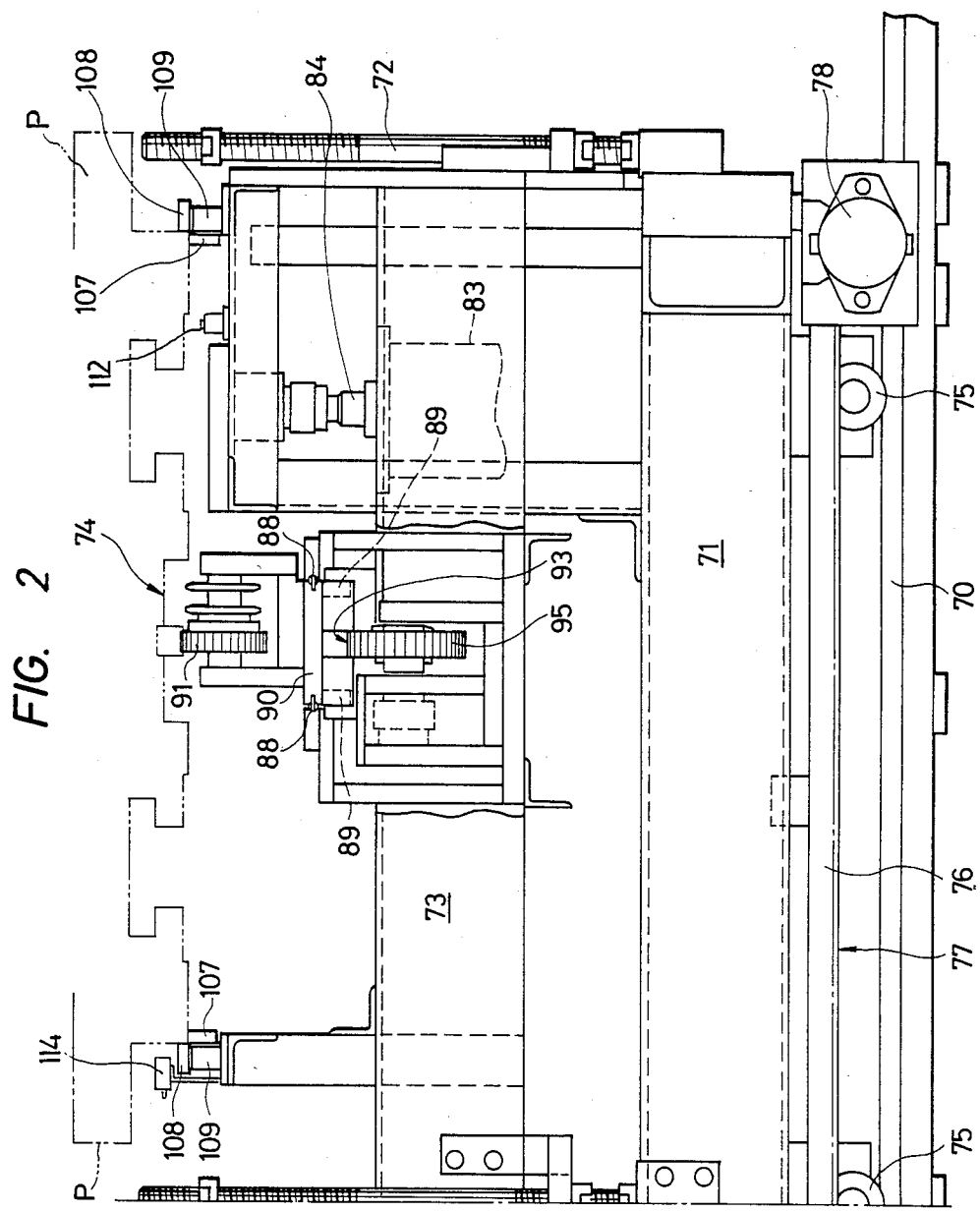
FIG. 2 is a front view of one-half of one of the automatic work exchanging apparatus.
Figure 3:
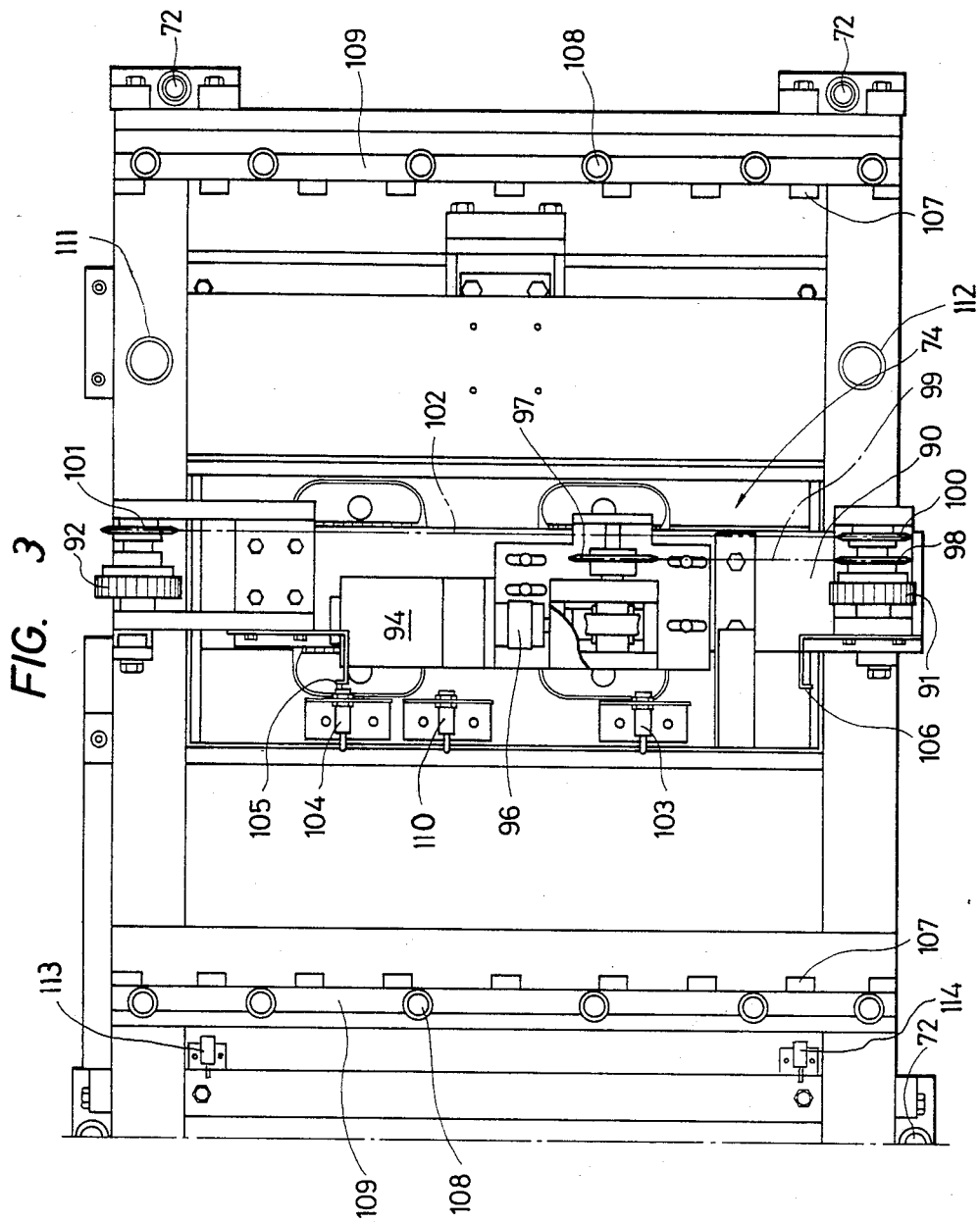
FIG. 3 is a plan view of the one-half of the apparatus shown in FIG. 2.
Figure 4:
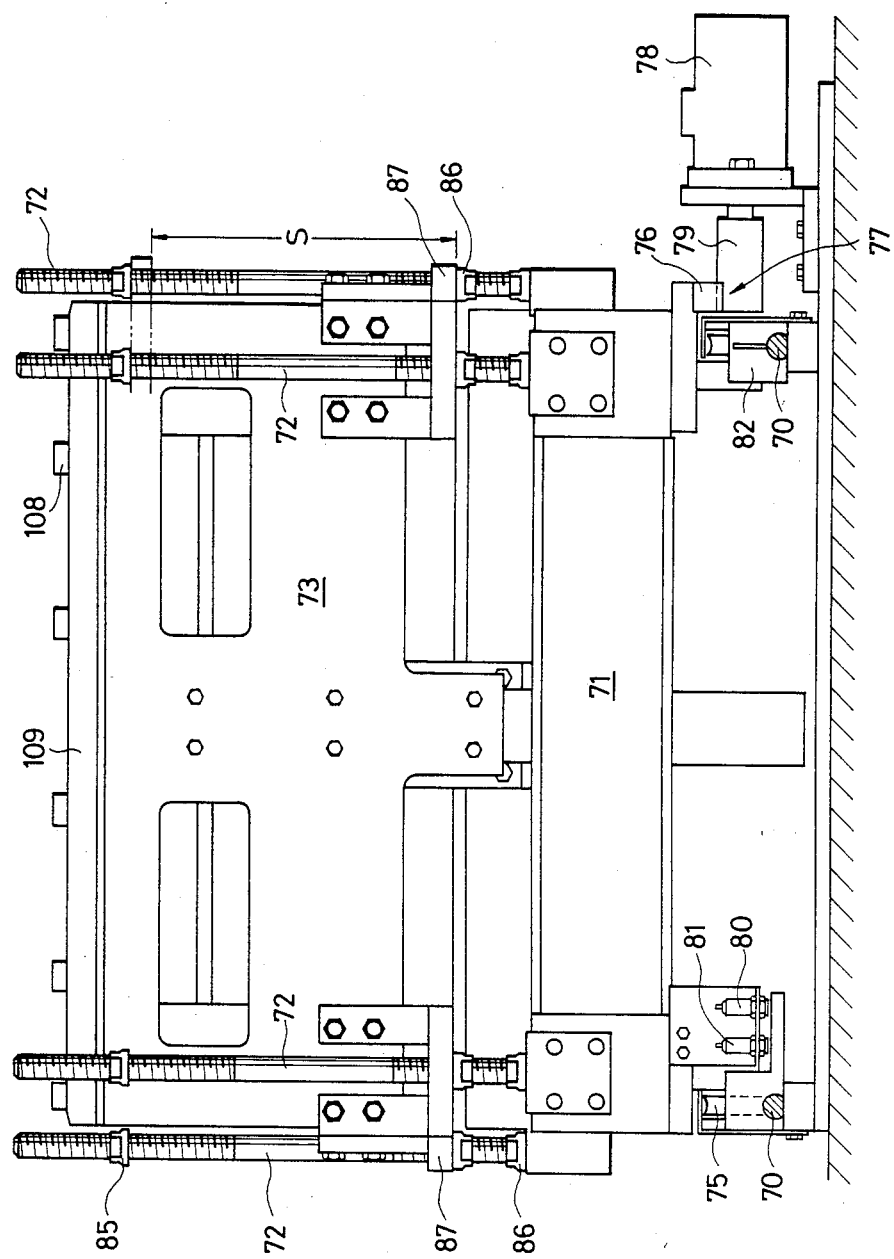
FIG. 4 is a side view of the apparatus shown in FIG. 2.
Figure 5:
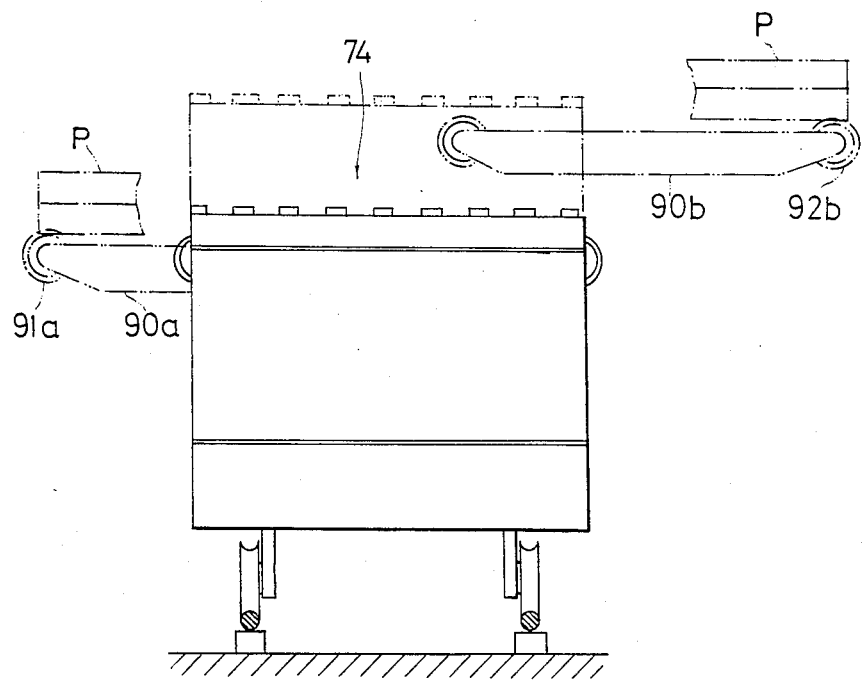
FIG. 5 is a side view illustrating the function of the automatic work exchanging apparatus.

Now the present invention will be explained in detail by an embodiment thereof shown in the attached drawings. FIG. 1 is a perspective view of an entire working process provided with a plurality of automatic work exchanging apparatus embodying the present invention; FIGS. 2 to 4 are front, plan and side view of the automatic work exchanging apparatus; and FIG. 5 is a side view shwing the function thereof.

Referring first to FIG. 1, A is an automatic warehouse, from which an article for machining (work W) already placed on a pallet P is taken out by a stacker crane 38 and is loaded through conveyor lines 52 on a transport truck T which is guided by guidelines L to a designated machine tool 2. In front of each machine tool 2 there are provided one or more automatic work exchanging apparatus 3 running on rails 4. The work W on the transport truck T arriving in front of the designated machine tool is received by the automatic work exchanging apparatus 3 and is further delivered onto the table 1 of the machine tool 2.

In a setting area (not illustrated), works are precisely positioned on pallet P, and the works thus set are transported to the automatic warehouse by the transport trucks. The works, after machining, are again loaded on the transport trucks through the automatic work exchanging apparatus and are stored in the automatic warehouse. The machine tools of different kinds may have tables of different heights. Consequently the automatic work exchanging apparatus is constructed in such a manner that the height of the working face is adjustable according to that of the table of each machine tool.

Now reference is made to FIG. 2 and ensuiing drawings showing the detailed structure of the automatic work exchanging apparatus 3.

FIGS. 2 to 4 show only the right-hand half of the apparatus but it is to be understood that a similar structure is symmetrically present in the left-hand half. The automatic work exchanging apparatus comprises a truck 71 laterally displacable in front of the machine tool along circularly sectioned rails 70, 70, a platform 73 vertically movable along supports 72 positioned at four corners and at the center of the truck 71, and a pallet displacing device 74 positioned on the platform 73.

Said truck 71 is supported by circularly sectioned rails 70, 70 through wheels 75 (cf. FIG. 4) and is displaced in a direction perpendicular to the plane of FIG. 4 by the engagement between a rack provided over the entire length and under a longitudinal frame 76 of the truck 71 and a pinion 79 connected to a motor 78 positioned on the ground. The stopping position of the truck 71 is determined by two proximity switches 80, 81 positioned at front and back of the truck 71 and a stopper 82.

The circular section of rails 70 prevents accumulation of metal dust and other debris thereon, thereby improving the positional accuracy of truck in the displacing and height directions.

The platform 73 positioned on said truck 71 is connected to piston rods 84 of electric or hydraulic vertical cylinders 83 provided in two positions, one at the right as shown in FIG. 2 and the other in a like position in the non-illustrated left-hand half of the truck 71. Platform 73 is supported by corner and side supports 72.

The laterally symmetrical positioning of said cylinders 83 prevents bending of the platform 73 and allows vertical movement thereof maintaining a horizontal top face.

The vertical moving stroke S of the platform is adjustable by the distance between the upper and lower nut members 85, 86 screwed on the supports 72, and the uppermost and lowermost positions of said platform are defined by the engagement of blocks 87 fixed thereon with the nut members 85, 86. The supports 72 pass through vertical apertures (not illustrated) provided in said blocks 87. In the present embodiment the lowermost position of the platform 73 is used for pallet transfer with the transport Truck T, while the uppermost position is used for pallet transfer with the machine tool 2.

The pallet displacing device provided on said platform 73 comprises, as shown in FIG. 2, a slidable member 90 guided by guide rails 88, 88 and guide rollers 89, 89 in a direction perpendicular to the plane of the drawing and two pinions 91, 92 supported at the front and rear of said slidable member for pulling or pushing the pallet.

Said slidable member 90 is displaced by a rack 93 provided on a lower face thereof and a pinion 95 driven by a motor 94 and engaged with the rack. The pinion 91 closer to the transport truck is driven by a motor 96 (cf. FIG. 3) on the slidable member 90 through sprockets 97, 98 and a chain 99, while the pinion 92 closer to the machine tool is driven by a chain 102 provided between a sprocket 100 coaxial with the pinion 91 and another sprocket 101. Said pinions 91, 92 are rotated in a same direction with an identical speed.

In FIG. 3 there are shown proximity switches 103, 104, 110 activated by iron pieces 105, 106 positioned on the slidable member in order to detect the position thereof. Also on the sides of the platform facing the machine tool and the transport truck there are provided proximity switches 111, 112 which are activated by the lower face of the pallet to detect the transfer thereof.

Also on said platform 73 there are provided guide rollers 107, 107 for supporting the lower face of the pallet P and guide rollers 108, 108 for controlling the lateral position of the pallet, all rotatably supported by frames 109, 109 integral with the platform 73.

Two units of the above-mentioned pallet displacing devices are provided in two positions on the platform 73. The right-hand unit is illustrated in FIGS. 2-4. The left-hand unit is not illustrated, but occupies a laterally symmetrical position. One such unit is loaded with a work while the other is empty in the stand-by state. Thus, upon completion of the work machining on the machine tool, the machined work is immediately ejected to the empty displacing device, then the automatic work exchanging apparatus 3 is displaced by a determined distance for exact positioned to the table, and the displacing device is activated to supply the unmachined work onto the table, thereby avoiding the loss of machine tool in waiting time.

In the following there will be given an explanation on the function of the above-explained automatic work exchanging apparatus. The transport truck T loaded with a pallet is guided along a guideline L toward a machine tool 2 for a particular machining and is stopped at a determined position upon detection of a response plate positioned on the ground in front of the automatic work exchanging apparatus 3 for said machine tool 2 by a proximity switch provided on the transport truck T. On the ground at said stopping position there is provided a conical member for determining the position of the transport truck, and a conical recess provided in a rod descending from the transport truck engages with said conical member to exert a wedge action, thereby defining the position of the transport truck T with respect to that of the automatic work exchanging apparatus 3 with an accuracy in the order of a millimeter. Subsequently the pallet displacing device (cf. FIGS. 2 and 3) of the automatic work exchanging apparatus 3 facing said transport truck T is activated. The pinions 91, 92 provided on the slidable member 90 are driven by the motor 96 shown in FIG. 3 in a direction to pull the pallet from the transport truck, and a pinion 95 shown in FIG. 2 is driven by the motor 94 to advance the slidable member 90 toward the transport truck by means of a rack 93 engaging with said pinion 95. When the slidable member 90 is advanced to a position represented by double-dotted chain lines 90a in FIG. 5, the pinion 91a at the end of the slidable member 90 engages with a rack (not illustrated) provided in the center of the lower face of the pallet P, thereby guiding the pallet onto the guide rollers (107 in FIG. 2) of the automatic work exchanging apparatus 3.

In this state the iron piece 105 of the slidable member 90 is positioned corresponding to the proximity switch 110 shown in FIG. 3 to activate said switch, whereby the motor 94 is stopped to hold the slidable member in its position. Upon passage of the lower face of the pallet over the proximity switch 112 on the platform during the course of transfer of the pallet onto the platform 73 by the rotation of the pinion 91, said switch 112 is activated to inversely rotate the motor 94 thereby returning the slidable member 90 to the original position. The iron piece 105 becomes positioned corresponding to the proximity switch 104 when the slidable member returns to the original position, and thereafter the pallet P is transferred onto the platform 73 solely by the rotation of the pinion 91. The rotation of the pinions 91, 92 is terminated when both proximity switches 111, 112 are activated by the lower face of the pallet P, whereby the pallet P is stopped on the platform 73, with side positions being defined by the lateral guide rollers 108, 108.

The automatic work exchanging apparatus 3, waiting in the above-mentioned state, moves to a position corresponding to the table of the machine tool in response to a work supply instruction from a control room, and the cylinder 83 shown in FIG. 2 is activated to elevate the platform 73 to the uppermost position thereof along the supports 72.

At the uppermost position of said platform 73, the slidable member 90 is advanced to a position 90b represented by double-dotted chain lines in FIG. 5 and the pinion 92b at the front end is rotated in a direction to push the pallet toward the table of the machine tool, whereby the pallet P is displaced along the guide rollers 107, 108 of the platform and transferred onto the guide rollers of said table.

The motor 94 is stopped when the iron piece 106 of the slidable member 90 becomes positioned corresponding to the proximity switch 103 of the platform, and the slidable member 90 is returned to the original position in response to a signal indicating the completion of transfer of the pallet onto the table of the machine tool. The work, after machining is transferred onto the transport truck according an inverse procedure.

We claim:

1. An automatic work exchanging apparatus for transferring palletized workpieces between a transport truck, automatically conveying a palletized workpiece from a remote location to a position in front of a selectable one of a plurality of machine tools, and said machine tool, comprising:

a transfer truck laterally displacable along a set of rails in front of the machine tool, said transfer truck being positioned between and adjacent to said machine tool and said transport truck in response to an external command;

a generally rectangular platform vertically movable along supports positioned at the four corners and at the center of each of the longer sides of said platform, said rectangle being so oriented as to have the longer sides parallel with the direction of displacement of the transfer truck;

a pair of pistons, vertically disposed between said transfer truck and said platform, cooperatively operable to cause said vertical motion of said platform so as to maintain said platform in a substantially horizontal orientation; and at least one pallet displacing device, positioned on and affixed to said platform;

wherein each said pallet displacing device further comprises:

a slidable member;

guide rails disposed on the platform for guiding said slidable member;

guide rollers supporting the slidable member enabling said slidable member to be moved in a direction perpendicular to the extent of the rails on which the transfer truck travels;

two pinions, one supported at each end of the slidable member, each of said pinions being capable of engaging a rack on a pallet carrying said workpiece;

switch means for detecting the position of the slidable member; and a driving device for operating the slidable member, said driving device having a second rack provided on a lower face of the slidable member and a third pinion driven by a motor mounted on the platform, said third pinion being engaged with the second rack, said one of the two pinions supported on said slidable member closer the transport truck being driven by a motor on the slidable member through sprockets and a first chain, and the other of the two pinions, supported on said slidable member closer to the machine tool, being driven by a second chain provided between a further sprocket coaxial with the former pinion and another sprocket so that said pinions are rotated in a same direction with an identical speed.

* * * * *